UNITED STATES PATENT OFFICE.

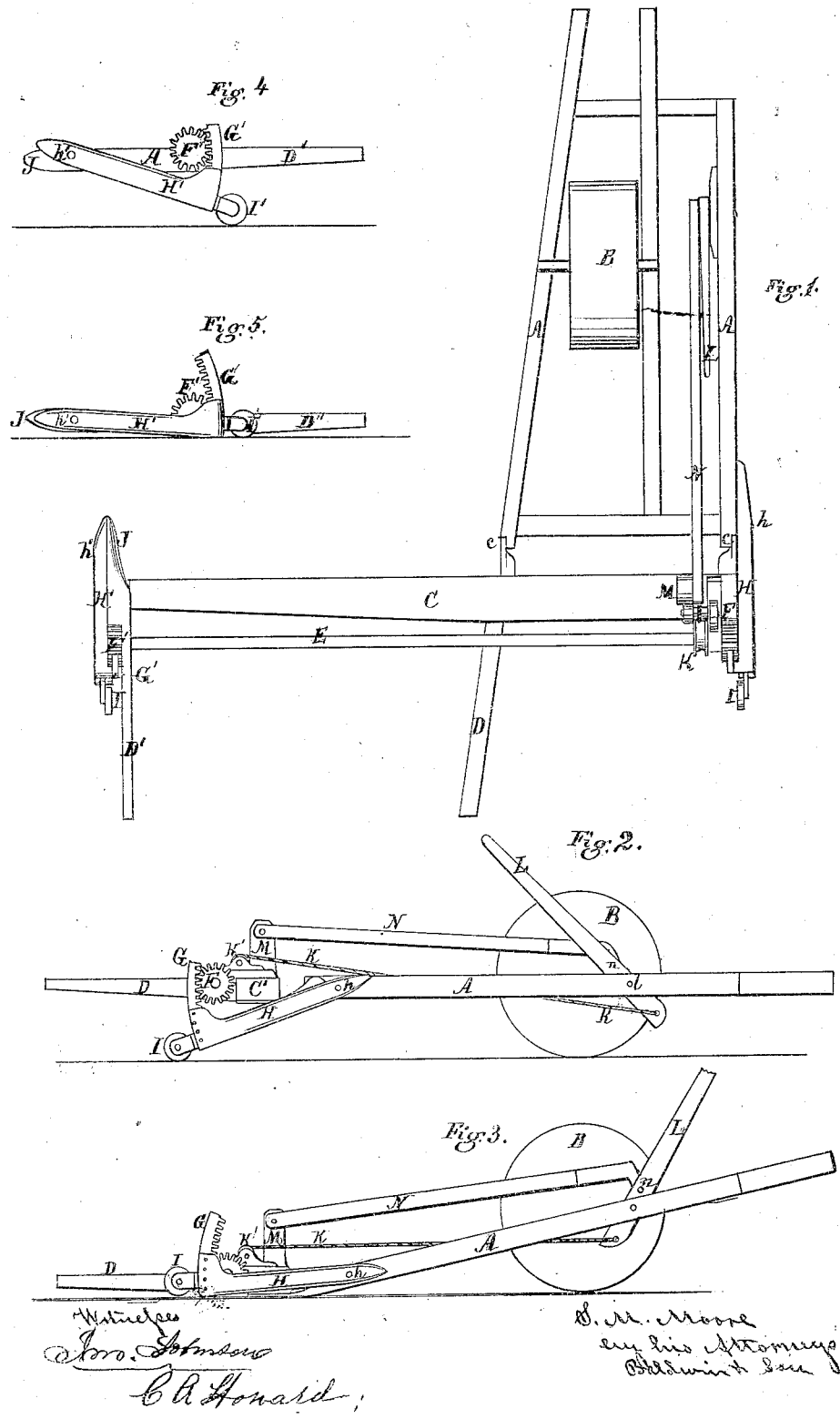

S. M. MOORE, OF BELOIT, WISCONSIN.

IMPROVEMENT IN HARVESTERS.

Specification forming part of Letters Patent No. 45,067, dated November 15, 1864.

*To all whom it may concern:*

Be it known that I, S. M. MOORE, of Beloit, in the county of Rock and State of Wisconsin, have invented a new and useful Improvement in Harvesters, of which the following is a full, clear, and exact description, reference being had to the accompanying drawings, making part of this specification, in which—

Figure 1 represents a plan or top view of so much of a harvester embracing my improvement as is necessary to illustrate my invention. Fig. 2 represents a view in elevation of the gearing side of the same when raised from the ground. Fig. 3 represents a similar view of the same with the cutting apparatus resting on the ground, as in mowing. Fig. 4 represents a similar view of the divider end of the machine when raised, and Fig. 5 a similar view of the same when resting on the ground.

My invention relates to that class of harvesters having the finger-beam and main frame connected by a yielding joint in or about the line of the cutting apparatus for the purpose of raising and lowering the machine; and my improvement consists in certain devices for preserving the horizontality of the finger-beam while being thus raised or lowered, as hereinafter more fully set forth.

In the accompanying drawings, a stout main frame, A, is shown as supported by a driving-wheel, B, and having a finger-beam, C, pivoted to its rear corners by means of lugs c, so as to farm a joint allowing vertical play. Beams D' D, projecting behind the finger-beam, serve both as track-clearers when mowing and as supports for a platform when reaping. A rock-shaft, E, is mounted in suitable bearings behind the finger-beam, so as to lie about even with and parallel to it, and carries at each end a small pinion, F F', which gears into correspondingly-toothed curved racks, G G', secured to the rear ends of radius-bars H H', which also carry at the same ends caster or other wheels, I I', to support the finger-beam.

These radius-bars are pivoted at their front ends so as to play vertically, the one, H', on the divider side being pivoted to the divider J at h', while the other, H, is pivoted to the side beam of the main frame at the point h, just in advance of the lug c. A pulley, K, on the shaft E is encircled by a chain or cord, k, which passes over a roller, k', on the finger-beam, and is attached to the lower end of a hand-lever, L, pivoted to the main frame. A post, M, on the finger-beam is likewise connected to this lever by a pivoted link-bar, N, the point n at which the link-bar is pivoted to the lever being just above its fulcrum l, and on the side opposite to that on which the chain or cord k is attached. The parts, when the finger-beam rests on the ground, occupy the position shown in Figs. 3 and 5 of the drawings.

In order to raise the cutting apparatus, the driver pulls the lever L back to the position shown in Figs. 1 and 2, which movement unwinds the cord k from the pulley K, rotates the rock-shaft E, and causes the pinions F F' to ascend the racks G G', and thus raise the machine. At the same time the link-bar N pushes the top of the post M backward, and thus tilts the finger-beam enough to counteract the tipping produced in raising it, by which means the guard-fingers are kept horizontal at any elevation.

The machine is of course to be provided with a suitable place for the driver and raker, as well as with a reel-cutting apparatus, platform, and other parts necessary to the effective operation of a harvester. The automatic rake may be applied, if desired.

Having thus described my improved machine, what I claim therein as new, and desire to secure by Letters Patent of the United States, is—

1. The combination of the hand-lever L, post M, and link-bar N with the finger-beam, when arranged and operating substantially as described, and for the purpose set forth.

2. The combination of the main frame, finger-beam, rock-shaft, radius-bars, racks and pinions, hand-lever, lifting-chain, and link-bar, as described, for the purpose set forth.

In testimony whereof I have hereunto subscribed my name.

S. M. MOORE.

Witnesses:
L. GOWING,
BENJN. F. WILSON.